US012316519B2

(12) United States Patent
Adachi

(10) Patent No.: US 12,316,519 B2
(45) Date of Patent: May 27, 2025

(54) VEHICLE-MOUNTED RELAY DEVICE AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Naoki Adachi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 324 days.

(21) Appl. No.: 17/755,965

(22) PCT Filed: Nov. 2, 2020

(86) PCT No.: PCT/JP2020/041074
§ 371 (c)(1),
(2) Date: May 12, 2022

(87) PCT Pub. No.: WO2021/095589
PCT Pub. Date: May 20, 2021

(65) Prior Publication Data
US 2022/0385553 A1    Dec. 1, 2022

(30) Foreign Application Priority Data

Nov. 13, 2019  (JP) .................................. 2019-205749

(51) Int. Cl.
*H04L 43/0823*    (2022.01)
*H04L 12/40*    (2006.01)
(Continued)

(52) U.S. Cl.
CPC .......... *H04L 43/0823* (2013.01); *H04L 12/40* (2013.01); *H04L 12/4625* (2013.01);
(Continued)

(58) Field of Classification Search
CPC ..... H04L 43/0823; H04L 12/40; H04L 67/12; H04L 2012/40215; H04L 43/0817;
(Continued)

(56) References Cited

U.S. PATENT DOCUMENTS

2008/0320585 A1* 12/2008 Ansari ................ H04L 63/1416
726/13
2017/0339034 A1* 11/2017 Lin ........................ H04L 47/12
(Continued)

FOREIGN PATENT DOCUMENTS

| JP | 2012-10021 A | 1/2012 |
| JP | 2017-47835 A | 3/2017 |
| JP | 2019-153887 A | 9/2019 |

OTHER PUBLICATIONS

International Search Report, Application No. PCT/JP2020/041074, mailed Jan. 26, 2021. ISA/Japan Patent Office.

*Primary Examiner* — Omer S Mian
(74) *Attorney, Agent, or Firm* — Honigman LLP

(57) ABSTRACT

Disclosed is a vehicle-mounted relay device that relays data flowing through a vehicle-mounted network mounted in a vehicle, including a control unit that controls processing relating to relaying of the data, wherein the control unit derives a threshold relating to a state of the vehicle-mounted network, and determines, based on the derived threshold, whether or not there is an abnormality in the vehicle-mounted network.

8 Claims, 4 Drawing Sheets

(51) Int. Cl.
  *H04L 12/46*    (2006.01)
  *H04L 67/12*    (2022.01)
  *B60R 16/023*   (2006.01)
  *G07C 5/00*     (2006.01)

(52) U.S. Cl.
  CPC ............ *B60R 16/023* (2013.01); *G07C 5/008* (2013.01); *H04L 2012/40215* (2013.01); *H04L 67/12* (2013.01)

(58) Field of Classification Search
  CPC ............... H04L 43/16; H04L 69/40; H04L 2012/40273; H04L 12/4625; B60R 16/023; G07C 5/008
  See application file for complete search history.

(56) References Cited

U.S. PATENT DOCUMENTS

| | | | |
|---|---|---|---|
| 2018/0076970 A1 | 3/2018 | Han et al. | |
| 2019/0253439 A1* | 8/2019 | Payton | .................... H04L 69/08 |
| 2020/0177412 A1 | 6/2020 | Tanabe et al. | |
| 2020/0259846 A1* | 8/2020 | Okano | ................ H04L 63/1425 |
| 2021/0377074 A1* | 12/2021 | Yoshida | ............ H04L 12/40104 |

\* cited by examiner

VEHICLE-MOUNTED RELAY DEVICE AND INFORMATION PROCESSING METHOD

CROSS-REFERENCE TO RELATED APPLICATIONS

This application is the U.S. national stage of PCT/JP2020/041074 filed on Nov. 2, 2020, which claims priority of Japanese Patent Application No. JP 2019-205749 filed on Nov. 13, 2019, the contents of which are incorporated herein.

TECHNICAL FIELD

The present disclosure relates to a vehicle-mounted relay device and an information processing method.

BACKGROUND

ECUs (Electronic Control Units) for controlling vehicle-mounted devices, including, for example, a power train system for engine control or the like, and a body system for air conditioner control or the like are mounted in a vehicle. While these ECUs are configured to transmit and receive messages using a vehicle-mounted network system, security measures are being considered against attacks such as an attacker making access to the vehicle-mounted network system to transmit an unauthorized frame, and there has been proposed a vehicle-mounted network device that monitors the vehicle-mounted network (e.g., Patent Document 1).

For the vehicle-mounted network device of JP 2017-47835A, a threshold used for determining whether or not there is an abnormality in the vehicle-mounted network is not taken into account when monitoring the vehicle-mounted network.

An object of the present disclosure is to provide a vehicle-mounted relay device and the like capable of efficiently setting a threshold used for determining whether or not there is an abnormality in a vehicle-mounted network.

SUMMARY

A vehicle-mounted relay device according to an aspect of the present disclosure is a vehicle-mounted relay device that relays data flowing through a vehicle-mounted network mounted in a vehicle, including a control unit that controls processing relating to relaying of the data, wherein the control unit derives a threshold relating to a state of the vehicle-mounted network, and determines, based on the derived threshold, whether or not there is an abnormality in the vehicle-mounted network.

Effects of the Present Disclosure

According to an aspect of the present disclosure, it is possible to provide a vehicle-mounted relay device and the like capable of efficiently setting a threshold used for determining whether or not there is an abnormality in a vehicle-mounted network.

DETAILED DESCRIPTION OF PREFERRED EMBODIMENTS

Figure 1:
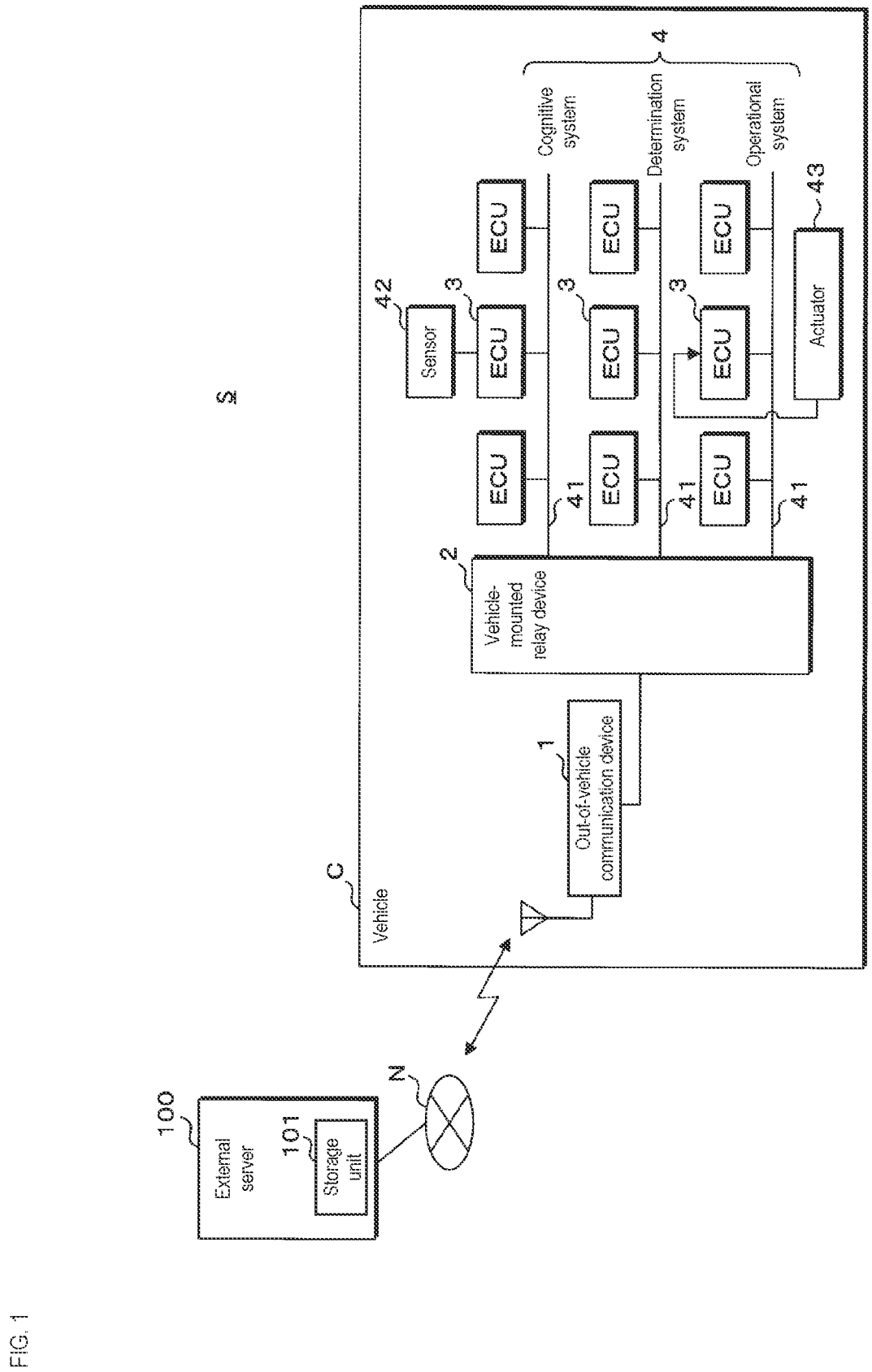
FIG. 1 is a schematic diagram showing an exemplary configuration of a vehicle-mounted relay system including a vehicle-mounted relay device according to Embodiment 1.

First, aspects of the present disclosure will be enumerated and described below. At least some of the aspects described below may be combined as appropriate.

A vehicle-mounted relay device according to an aspect of the present disclosure is a vehicle-mounted relay device that relays data flowing through a vehicle-mounted network mounted in a vehicle, including a control unit that controls processing relating to relaying of the data, wherein the control unit derives a threshold relating to a state of the vehicle-mounted network, and determines, based on the derived threshold, whether or not there is an abnormality in the vehicle-mounted network.

In the present aspect, the vehicle-mounted relay device derives a threshold relating to a state of the vehicle-mounted network, and determines, based on the derived threshold, whether or not there is an abnormality in the vehicle-mounted network. Accordingly, it is possible to efficiently set a threshold used for determining whether or not there is an abnormality in the vehicle-mounted network. The vehicle-mounted relay device can derive a threshold based on the specifications or characteristics corresponding to each individual vehicle by deriving the threshold relating to the state of the vehicle-mounted network in a step subsequently performed after the own device has been mounted in the vehicle, including, for example, the manufacturing stage of the vehicle.

In the vehicle-mounted relay device according to an aspect of the present disclosure, the control unit obtains information relating to a state of the vehicle-mounted network, and derives, based on the obtained information relating to the state of the vehicle-mounted network, a threshold relating to the state of the vehicle-mounted network.

In the present aspect, the vehicle-mounted relay device obtains information relating to the state of the vehicle-mounted network, such as the type of a message transmitted using CAN communication, or a bandwidth utilization rate, and derives the threshold, based on the obtained information relating to the state of the vehicle-mounted network. Accordingly, it is possible to efficiently derive a threshold conforming to a vehicle-mounted network for which the threshold is to be set.

In the vehicle-mounted relay device according to an aspect of the present disclosure, modification of the derived threshold is restricted, and if a cancelation condition for cancelling the restriction is satisfied, the control unit cancels the restriction on the modification of the threshold, newly derives a threshold, and determines, based on the newly derived threshold, whether or not there is an abnormality in the vehicle-mounted network.

In the present aspect, modification of the derived threshold is restricted, and it is therefore possible to ensure the robustness of the threshold. In addition, if a cancelation condition for cancelling the restriction is satisfied, the vehicle-mounted relay device cancels the restriction on the modification of the threshold, and newly derives a threshold. Accordingly, it is possible to ensure the robustness of the threshold, while resetting the threshold by newly deriving a threshold as needed, and to determine, based on the reset threshold, whether or not there is an abnormality in the vehicle-mounted network, thus efficiently ensuring the appropriateness of the threshold.

In the vehicle-mounted relay device according to an aspect of the present disclosure, a plurality of candidate thresholds serving as candidates for a threshold relating to a state of the vehicle-mounted network are stored in a predetermined storage area, and the control unit derives, based on information relating to implementation configuration of the vehicle, any threshold from among the plurality of candidate thresholds as the threshold relating to the state of the vehicle-mounted network by referring to the predetermined storage area.

In the present aspect, a plurality of candidate thresholds serving as the candidates for the threshold relating to the state of the vehicle-mounted network are stored in a predetermined storage area that can be accessed from the vehicle-mounted relay device, and the vehicle-mounted relay device derives, based on information relating to implementation configuration of the vehicle in which the own device is mounted, any threshold from among the plurality of candidate thresholds, as the threshold relating to the state of the vehicle-mounted network to which the own device is connected. Accordingly, the vehicle-mounted relay device selects, based on the implementation configuration of the vehicle, a threshold from among the plurality of candidate thresholds stored in the predetermined storage area, and therefore can efficiently derive the threshold.

In the vehicle-mounted relay device according to an aspect of the present disclosure, a plurality of candidate thresholds serving as candidates for a threshold relating to a state of the vehicle-mounted network are stored in a predetermined storage area, and the control unit derives, based on information relating to a driving state of the vehicle, any threshold from among the plurality of candidate thresholds as the threshold relating to the state of the vehicle-mounted network by referring to the predetermined storage area.

In the present aspect, a plurality of candidate thresholds serving as the candidates for the threshold relating to the state of the vehicle-mounted network are stored in a predetermined storage area that can be accessed from the vehicle-mounted relay device, and the vehicle-mounted relay device derives, based on information relating to a driving state of the vehicle in which the own device is mounted, any threshold from among the plurality of candidate thresholds, as the threshold relating to the state of the vehicle-mounted network to which the own device is connected. Accordingly, it is possible to efficiently derive a dynamically varying threshold, based on the driving state of the vehicle in which the own device is mounted.

In the vehicle-mounted relay device according to an aspect of the present disclosure, the threshold relating to the state of the vehicle-mounted network includes a threshold relating to traffic of the vehicle-mounted network.

In the present aspect, the threshold relating to the state of the vehicle-mounted network includes the threshold relating to traffic of the vehicle-mounted network. Accordingly, it is possible to efficiently detect an attack such as an unauthorized access manifested in the traffic.

In the vehicle-mounted relay device according to an aspect of the present disclosure, the threshold relating to the state of the vehicle-mounted network includes a threshold relating to a standard deviation of reception intervals of data that is transmitted cyclically in the vehicle-mounted network.

In the present aspect, the threshold relating to the state of the vehicle-mounted network includes a threshold relating to a standard deviation of reception intervals of data that is transmitted cyclically. Accordingly, it is possible to efficiently detect an attack such as an unauthorized access manifested in the reception intervals of data that is transmitted cyclically, in particular, in CAN communication.

A vehicle-mounted relay device according to an aspect of the present disclosure further includes a plurality of communication units respectively connected to a plurality of buses included in the vehicle-mounted network, wherein the control unit derives a threshold relating to a state of each of the plurality of buses respectively connected to the plurality of communication units, and determines, based on each of the derived thresholds, whether or not there is an abnormality in each of the plurality of buses included in the vehicle-mounted network.

In the present aspect, the vehicle-mounted relay device derives a threshold relating to the state of each of the plurality of buses retrospectively connected to the plurality of communication units, and determines, based on each of the derived thresholds, whether or not there is an abnormality in each of the plurality of buses. Accordingly, even if the bus connected to any of the communication units has encountered an attack such as an unauthorized access, it is possible to efficiently detect the attack.

A vehicle-mounted relay device according to an aspect of the present disclosure further includes: a CAN communication unit for performing CAN communication; and an Ethernet communication unit for performing Ethernet communication, wherein the threshold relating to the state of the vehicle-mounted network includes a threshold relating to a correlation value between states of communication respectively performed with the CAN communication unit and the Ethernet communication unit.

In the present aspect, the threshold relating to the state of the vehicle-mounted network includes a threshold relating to a correlation value between the states of communication respectively performed with the CAN communication unit and the Ethernet communication unit. Accordingly, if any of the CAN segments or the Ethernet segments has encountered an attack such as an unauthorized access, it is possible to efficiently detect the attack.

An information processing method according to an aspect of the present disclosure causes a computer to execute processing for: deriving a threshold relating to a state of a vehicle-mounted network through which data to be relayed flows; and determining, based on the derived threshold, whether or not there is an abnormality in the vehicle-mounted network.

According to the present aspect, a computer can be operated as a vehicle-mounted relay device capable of efficiently setting a threshold used for determining whether or not there is an abnormality in a vehicle-mounted network.

In the following, the present disclosure will be described in detail with reference to the drawings showing embodiments thereof. Vehicle-mounted relay devices 2 according to embodiments of the present disclosure will be described below with reference to the drawings. It should be noted that the present disclosure is not limited to these examples, but is defined by the claims, and is intended to include all modifications which fall within the scope of the claims and the meaning and scope of equivalents thereof.

Embodiment 1

Figure 2:
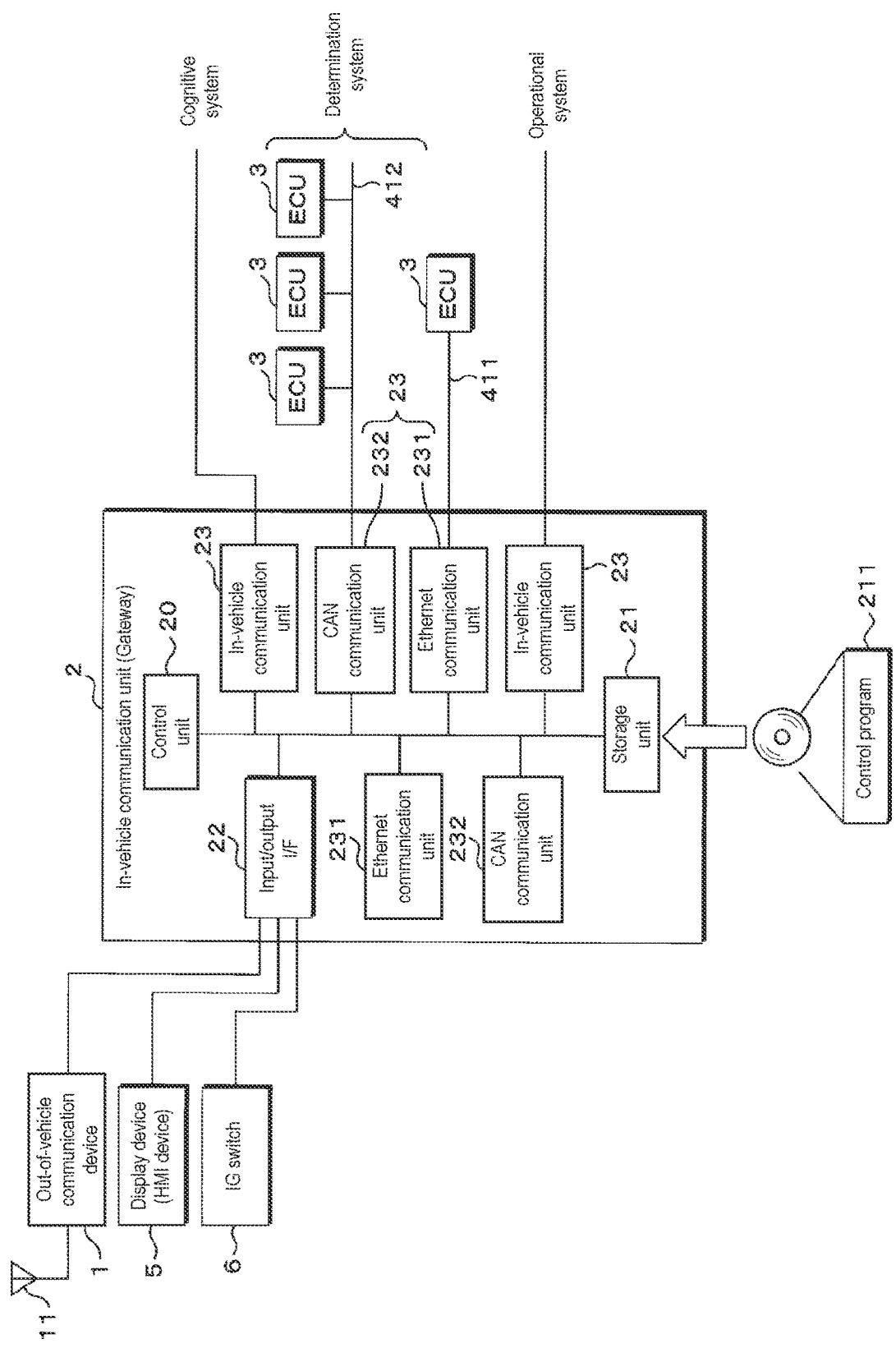
FIG. 2 is a block diagram showing an exemplary physical configuration of the vehicle-mounted relay device.

Hereinafter, an embodiment will be described with reference to the drawings. FIG. 1 is a schematic diagram showing an exemplary configuration of a vehicle-mounted relay system S including a vehicle-mounted relay device 2 according to Embodiment 1. FIG. 2 is a block diagram showing an exemplary physical configuration of the vehicle-mounted relay device 2.

The vehicle-mounted relay system S includes a vehicle-mounted relay device 2 mounted in a vehicle, and an out-of-vehicle communication device 1. The vehicle-mounted relay device 2 relays communication between a plurality of vehicle-mounted ECUs 3 mounted in the vehicle. The vehicle-mounted relay device 2 may communicate, via the out-of-vehicle communication device 1, with an external server 100 connected via an out-of-vehicle network N, and relay communication between the external server 100 and the vehicle-mounted ECUs 3 mounted in the vehicle.

The external server 100 is, for example, a computer such as a server connected to the out-of-vehicle network N such as the Internet or a public network, and includes a storage unit 101 constituted by a RAM (Random Access Memory), a ROM (Read Only Memory) or a hard disk or the like. Information relating to a threshold of a vehicle-mounted network 4, which will be described later, may be saved in the storage unit 101 of the external server 100.

The out-of-vehicle communication device 1, the vehicle-mounted relay device 2, a display device 5, and the plurality of vehicle-mounted ECUs 3 for controlling various vehicle-mounted devices are mounted in a vehicle C. The vehicle-mounted relay device 2 and the out-of-vehicle communication device 1 are communicably connected, for example, by a wire harness such as a serial cable. The vehicle-mounted relay device 2 and the vehicle-mounted ECUs 3 are communicably connected via communication lines 41 and a vehicle-mounted network 4 corresponding to a communication protocol such as a CAN (Control Area Network/registered trademark) or Ethernet (Ethernet/registered trademark). The communication protocol used by the vehicle-mounted relay device 2 and the vehicle-mounted ECUs 3 may be LIN, MOST, FlexRay, or the like.

The out-of-vehicle communication device 1 includes an out-of-vehicle communication unit (not shown), and an input/output I/F (not shown) for communicating with the vehicle-mounted relay device 2. The out-of-vehicle communication unit is a communication device for performing wireless communication using a mobile communication protocol such as 3G, LTE, 4G, or WiFi, and transmits and receives data to and from the external server 100 via an antenna 11 connected to the out-of-vehicle communication unit. The communication between the out-of-vehicle communication device 1 and the external server 100 is performed, for example, via the external network N such as a public network or the Internet. The input/output I/F is a communication interface for performing, for example, serial communication with the vehicle-mounted relay device 2. The out-of-vehicle communication device 1 and the vehicle-mounted relay device 2 communicate with each other via the input/output I/F and a wire harness such as a serial cable connected to the input/output I/F. In the present embodiment, the out-of-vehicle communication device 1 is a device that is separate from the vehicle-mounted relay device 2, and these devices are communicably connected to each other via the input/output I/F and the like. However, the present disclosure is not limited thereto. The out-of-vehicle communication device 1 may be built in the vehicle-mounted relay device 2 as a constituent part of the vehicle-mounted relay device 2.

The vehicle-mounted relay device 2 includes a control unit 20, a storage unit 21, an input/output I/F 22, and an in-vehicle communication unit 23. The vehicle-mounted relay device 2 is a gateway (relay) that generally controls segments, including, for example, a vehicle-mounted ECU 3 of a cognitive system, a vehicle-mounted ECU 3 of a determination system, and a vehicle-mounted ECU 3 of an operational system, including a plurality of communication lines 41, and that relays communication between the vehicle-mounted ECUs 3 between these segments. Each of the plurality of communication lines 41 corresponds to the bus of the corresponding segment. The vehicle-mounted relay device 2 may be configured as a functional unit of a body ECU that performs overall control of the vehicle C. The vehicle-mounted relay device 2 may be a relay device (repromaster) configured to obtain, from the out-of-vehicle communication device 1, an update program received by the out-of-vehicle communication device 1 from the external server 100 via wireless communication, and to transmit the update program to a predetermined vehicle-mounted ECU 3 (a vehicle-mounted ECU 3 to be updated) via the vehicle-mounted network 4.

The control unit 20 is formed by a CPU (Central Processing Unit) or an MPU (Micro Processing Unit) or the like, and is configured to perform various types of control processing and arithmetic processing or the like by reading out and executing a control program and a data that are stored in advance in the storage unit 21.

The storage unit 21 is formed by a volatile memory device such as a RAM (Random Access Memory) or a nonvolatile memory device such as an ROM (Read Only Memory), an EEPROM (Electrically Erasable Programmable ROM), or a flash memory, and a control program and data that is referred to during processing are stored in advance in the storage unit 21. The control program stored in the storage unit 21 may be a control program read out from a recording medium 211 that can be read by the vehicle-mounted relay device 2. Alternatively, the control program may be downloaded from an external computer (not shown) connected to a communication network (not shown), and be stored in the storage unit 21. Information relating to a threshold of the vehicle-mounted network 4, which will be described later, is stored in the storage unit 21.

Relay path information (routing table) used for performing relay processing for communication between the vehicle-mounted ECUs 3, or communication between the vehicle-mounted ECUs 3 and the external server 100 is stored in the storage unit 21. The format of the relay path information is determined based on a communication protocol. When the communication protocol is CAN, CAN relay path information includes a message identifier (CAN-ID) included in a CAN message, and a relay destination (an I/O port number of a CAN communication unit 232) associated with the CAN-ID. When the communication protocol is TCP/IP, TCP/IP relay path information includes a transmission destination address (a MAC address or an IP address) included in an IP packet, and a relay destination (a physical port number of an Ethernet communication unit 231) associated with the transmission destination address.

Configuration information (vehicle configuration information) of all the vehicle-mounted ECUs 3 mounted in the vehicle C is stored in the storage unit 21. The configuration information (vehicle configuration information) of each of the vehicle-mounted ECUs 3 that is stored in the storage unit 21 includes, for example, a manufacturing number (serial number) of the vehicle-mounted ECU 3, an ECU part number (model number), a Software part number, the current version of the program, a MAC (Media Access Control) address, an IP address, and a VIN (vehicle identification number). If the vehicle-mounted ECUs 3 are connected using a CAN, the configuration information of each vehicle-mounted ECU 3 may include a CAN-ID used (included) by the vehicle-mounted ECU 3 when transmitting a message. These pieces of vehicle configuration information are managed in association with an ECU-ID constituted by a serial number or the like that is set for each of the individual vehicle-mounted ECUs 3 so as not to be redundant, and are stored in the storage unit 21, for example, as data in the form of a table. The control unit 20 obtains, at a predetermined timing such as when an IG switch 6 (ignition switch) is turned on or off, the configuration information of each of the vehicle-mounted ECUs 3, from all the vehicle-mounted ECUs 3 steadily mounted in the vehicle C, or a particular vehicle-mounted ECU 3, and stores the configuration information in the storage unit 21. Furthermore, information relating to the shipment destination, the vehicle type, the vehicle specifications, and the optional equipment of the vehicle C may be stored in the storage unit 21. Information relating to the implementation configuration of the vehicle C includes the vehicle configuration information, and the information relating to the shipment destination, the vehicle type, the vehicle specifications, and the optional equipment of the vehicle C. Accordingly, by referring to the vehicle configuration information stored in the storage unit 21, or the information relating to the vehicle specifications or the like, the control unit 20 of the vehicle-mounted relay device 2 can obtain the information relating to the implementation configuration of the vehicle C in which the own device is mounted.

Similarly to the input/output I/F of the out-of-vehicle communication device 1, the input/output I/F 22 is a communication interface for performing serial communication, for example. The vehicle-mounted relay device 2 is communicably connected, via the input/output I/F 22, to the out-of-vehicle communication device 1, the display device 5 (HMI device), and the IG switch 6 for activating and stopping the vehicle C.

The in-vehicle communication unit 23 is, for example, an input/output interface (CAN communication unit 232, Ethernet communication unit 231) using a communication protocol of a CAN (Control Area Network), CAN-FD (CAN with Flexible Data Rate), or Ethernet (Ethernet/registered trademark), and the control unit 20 communicates, via the in-vehicle communication unit 23, with the vehicle-mounted ECU 3 connected to the vehicle-mounted network 4, or another vehicle-mounted device such as a relay device.

The Ethernet communication unit 231 is an Ethernet PHY unit corresponding to a TCP/IP packet transmitted by an Ethernet cable 411 such as 100BASE-T1 or 1000BASE-T1.

The CAN communication unit 232 is a CAN transceiver or a CAN-FD transceiver that corresponds to a communication protocol of a CAN or CAN-FD, corresponds to a CAN message transmitted on a CAN bus 412, and receives a waveform resulting from a potential difference between differential voltages on the CAN bus 412, which is formed by two wires respectively disposed on the high side and the low side, and decodes the received waveform into a signal represented by a bit string of 1s and 0s. Alternatively, the CAN communication unit 232 may include the CAN transceiver and a CAN controller, or include the CAN-FD transceiver and a CAN-FD controller.

A plurality of the in-vehicle communication units 23 (Ethernet communication units 231, CAN communication units 232) are provided, and each of the communication lines 41 (Ethernet cable 411, CAN bus 412), or in other words, each of the buses constituting the vehicle-mounted network 4 is connected to each of the in-vehicle communication units 23. By providing a plurality of the in-vehicle communication units 23 in this manner, the vehicle-mounted network 4 may be divided into a plurality of segments, and the vehicle-mounted ECUs 3 may be connected to the segments according to the function (cognitive system function, determination system function, or operational system function) of the vehicle-mounted ECUs 3.

Similarly to the vehicle-mounted relay device 2, each vehicle-mounted ECU 3 includes a control unit (not shown), a storage unit (not shown), and an in-vehicle communication unit (not shown). The storage unit is formed by a volatile memory device such as a RAM (Random Access Memory), or a nonvolatile memory device such as a ROM (Read Only Memory), an EEPROM (Electrically Erasable Programmable ROM), or a flash memory, and a program or data of the vehicle-mounted ECU 3 is stored in the storage unit. Similarly to the vehicle-mounted relay device 2, the in-vehicle communication unit includes an Ethernet communication unit or a CAN communication unit, and the vehicle-mounted ECU 3 communicate with the vehicle-mounted relay device 2 via the in-vehicle communication unit.

As shown in FIGS. 1 and 2, the function of each vehicle-mounted ECU 3 may be classified as, for example, a cognitive system function, a determination system function, or an operational system function by executing the program stored in the storage unit of the vehicle-mounted ECU 3.

The vehicle-mounted ECU 3 of the cognitive system is connected to, for example, a sensor 42 such as a camera, an infrared sensor, or a LIDAR (Light Detection and Ranging), performs, for example, digital conversion on an output value output from the sensor 42, and transmits (outputs) the converted value to the vehicle-mounted ECU 3 of the determination system via the vehicle-mounted network 4.

The vehicle-mounted ECU 3 of the determination system receives (obtains) data transmitted, for example, from the vehicle-mounted ECU 3 of the cognitive system, generates, based on the received data, data for exerting the automatic driving function of the vehicle C, or performs processing for processing such data, and transmits (outputs) the data that has been generated or the like to the vehicle-mounted ECU 3 of the operational system via the vehicle-mounted network 4.

The vehicle-mounted ECU 3 of the operational system is connected to, for example, an actuator 43 (vehicle-mounted drive device) such as a motor, an engine, or a brake, receives (obtains) data transmitted from the vehicle-mounted ECU 3 of the determination system, and controls, based on the received data, the operation of the actuator, for example, to travel, stop, or steer the vehicle C, thus exerting the automatic driving function. The vehicle-mounted ECU 3 of the operational system may be connected to a secondary battery such as a lithium ion battery, and control the charge and discharge of the secondary battery.

The display device 5 is, for example, an HMI (Human Machine Interface) device such as a car navigation display. The display device 5 is communicably connected to the input/output I/F 22 of the vehicle-mounted relay device 2 by a harness such as a serial cable. Data or information that is output from the control unit 20 of the vehicle-mounted relay device 2 via the input/output I/F 22 is displayed on the display device 5.

By executing the control program stored in the storage unit 21, the control unit 20 of the vehicle-mounted relay device 2 functions as an obtaining unit that obtains information relating to the state of the vehicle-mounted network 4. For each of the communication lines 41 (buses) connected to each of the in-vehicle communication units 23 including the Ethernet communication unit 231 or the CAN communication unit 232, the obtaining unit obtains an average bus load (average bandwidth utilization rate), a maximum bus load value (maximum bandwidth utilization rate), a bus load fluctuating range (difference between minimum and maximum bandwidth utilization rates) of the communication line 41 (bus). The obtaining unit detects the traffic (communication data amount) of each of the communication lines 41 (buses) connected to each of the in-vehicle communication units 23, and derives a bandwidth utilization rate (bus load) per unit time of the traffic, an average utilization rate (average bus load) in a predetermined period, and the like, thus obtaining these bus loads and the like. The obtaining unit may further obtain, for predetermined data that is transmitted periodically or cyclically, a standard deviation of the transmission intervals of data in a predetermined period. That is, the information relating to the state of the vehicle-mounted network 4 includes at least one of an average bus load, a maximum bus load value, and a bus load fluctuating range of the communication line 41 (bus) connected to each of the the in-vehicle communication units 23, and a standard deviation of the transmission intervals of data that is transmitted cyclically.

By executing the control program stored in the storage unit 21, the control unit 20 of the vehicle-mounted relay device 2 functions as a deriving unit that derives a threshold relating to the state of the vehicle-mounted network 4. The deriving unit derives, based on the information relating to the state of the vehicle-mounted network 4, including an average bus load or a standard deviation of transmission intervals or the like of data that is transmitted cyclically, various thresholds for determining whether the vehicle-mounted network 4 is normal or abnormal. In the case of deriving a threshold based on information relating to the value of the bus load caused by traffic, including, for example, an average bus load, a maximum bus load value, or a bus load fluctuating range, the deriving unit may derive, as the threshold, a value obtained by multiplying the average bus load or the like by a predetermined coefficient or ratio so as to include a margin value. In the case of deriving a threshold based on a standard deviation of transmission intervals of data that is transmitted cyclically, the deriving unit may derive, as the threshold, a value obtained by multiplying the standard deviation by a predetermined coefficient of 1 or more, for example.

The deriving unit may derive a threshold based on information relating to the states of the plurality of communication lines 41 (buses). The deriving unit may obtain the respective average bus loads of one of the CAN communication units 232 and one of the Ethernet communication units 231, and may derive a threshold based on the ratio between the average bus loads of the CAN communication unit 232 and the Ethernet communication unit 231. If the respective average bus loads of one of the CAN communication units 232 and one of the Ethernet communication units 231 have a positive correlation, for example, an average bus load of the Ethernet communication unit 231 tends to increase as the average bus load of the CAN communication unit 232 increases. Based on the information relating to the states of a plurality of in-vehicle communication units 23 having a positive correlation or a negative correlation in this manner, it is possible to derive thresholds associated with the plurality of in-vehicle communication units 23. The deriving unit stores each of the derived thresholds in the storage unit 21, and sets the threshold as a threshold for performing abnormality determination in the vehicle-mounted network 4.

The deriving unit may derive the threshold relating to the state of the vehicle-mounted network 4 in a step subsequently performed after the vehicle-mounted relay device 2 (own device) has been mounted in the vehicle C in the manufacturing stage or the like of the vehicle C. In the case of deriving the threshold relating to the state of the vehicle-mounted network 4 in the manufacturing stage or the like of the vehicle C, the threshold has not yet been stored in the storage unit 21 of the vehicle-mounted relay device 2. Accordingly, when communication using a communication protocol such as a CAN or Ethernet or the like is performed in the vehicle-mounted network 4, the deriving unit can obtain the information relating to the state of the vehicle-mounted network 4, and store the threshold derived based on the information in the storage unit 21. Alternatively, a setting flag indicating whether or not a threshold used for abnormality determination in the vehicle-mounted network 4 has been set (has been stored in the storage unit 21) is stored in the storage unit 21. In the manufacturing stage or the like of the vehicle C, the setting flag indicates, as an initial value, that the threshold is unset. If the setting flag indicates that the threshold is unset, the deriving unit may set the derived threshold as a value used for abnormality determination in the vehicle-mounted network 4. The deriving unit may set (store in the storage unit 21) the derived threshold as a value used for abnormality determination in the vehicle-mounted network 4, and thereafter changing the information indicated by the setting flag from an unset state to a set state, thus maintaining the set state of the threshold.

Modification (resetting) of the threshold that has been set for use in abnormality determination in the vehicle-mounted network 4 may be restricted after the threshold has been set. That is, when the derived threshold has already been stored in the storage unit 21 as the threshold used for abnormality determination of the vehicle-mounted network 4, or when the information relating to the setting flag described above indicates that the threshold has already been set, modification (resetting) of the set threshold may be restricted or prohibited. Through restriction or the like of modification (resetting) of the set threshold in this manner, it is possible to prevent unauthorized modification or the like of the set threshold by an unauthorized access (attack) from outside the vehicle C, thus ensuring the robustness for the threshold.

By executing the control program stored in the storage unit 21, the control unit 20 of the vehicle-mounted relay device 2 functions as a determination unit that determines, based on the derived threshold, whether or not there is an abnormality in the vehicle-mounted network 4. The determination unit obtains, similarly to the obtaining unit, information relating to the state of the vehicle-mounted network 4 by monitoring each of the in-vehicle communication units 23, or based on the data relayed between the in-vehicle communication units 23. The determination unit compares an average bus load or a standard deviation or the like of transmission intervals of data that is transmitted cyclically, each of which included in the obtained information relating to the state of the vehicle-mounted network 4, with the threshold corresponding to the information, and if the obtained information exceeds the threshold, determines that an abnormality has occurred in the vehicle-mounted network 4. When determining that an abnormality has occurred in the vehicle-mounted network 4, the determination unit may determine in which of the communication lines 41 (buses) connected to the in-vehicle communication unit 23 the abnormality has occurred.

Even after setting (storing in the storage unit 21) the derived threshold as the value used for abnormality determination in the vehicle-mounted network 4, if a predetermined condition (cancelation condition) is provided, the deriving unit may cancel the restriction on the modification of the threshold, then newly derive (re-derive) a threshold, and perform resetting using the newly derived threshold. That is, if a cancelation condition is provided, the deriving unit may re-derive a threshold, and overwrite or modify, with the re-derived threshold, the threshold that has been derived and stored in the storage unit 21 in the previous time, thereby setting the re-derived threshold as a value used for abnormality determination in the vehicle-mounted network 4.

The cancelation condition may be such that, for example, a manufacturing facility (factory tool) used in the manufacturing stage or the like of the vehicle C, or a maintenance device such as a diagnostic tool or the like used by an authorized dealer or the like is connected to the vehicle-mounted relay device 2, and the connection has been normally performed. If the connection has been performed normally, the state (mode) of the vehicle-mounted relay device 2 may be shifted to a threshold setting enabling mode that enables resetting of the threshold, in accordance with a request from the factory tool or the like. If a cancelation condition is provided in this manner, by shifting the vehicle-mounted relay device 2 to the threshold setting enabling mode, the deriving unit of the vehicle-mounted relay device 2 can newly derive (re-derive) a threshold, and perform resetting using the newly derived threshold.

The cancelation condition may be a condition based on information held by the vehicle-mounted relay device 2, or information that can be obtained by the vehicle-mounted relay device 2 via the vehicle-mounted network 4. The vehicle-mounted relay device 2 may determine whether or not a cancelation condition is provided, based on information that can be obtained from the vehicle-mounted device such as the vehicle-mounted ECU 3 via the vehicle-mounted network 4, including, for example, the number of times that a predetermined vehicle-mounted ECU 3 is activated, the number of times that the IG switch 6 is turned on, the number of times that the power storage device (battery) such as a secondary battery is removed, the cumulative travel distance measured by an odometer, positional information (positional information corresponding to the location of the assembly plant of the vehicle C) on the GPS, and the like. That is, the vehicle-mounted relay device 2 may determine that a cancelation condition is provided, based on information indicating, for example, that the number of times that the IG switch 6 is turned on is less than or equal to a predetermined number, or that the positional information on the GPS belongs to the location of the assembly plant of the vehicle C, and be shifted to the threshold setting enabling mode. The cancelation condition may use so-called one-time permission processing, including, for example, storing the threshold in the storage unit 21 using a nonvolatile memory that is writable only once, and responding to a request from the above-described factory tool, diagnostic tool, or the like only once. The deriving unit performs resetting (overwriting to the storage unit 21) using the newly derived (re-derived) threshold. In the case of setting a value from a factory tool or an authorized dealer, the resetting may be performed using an SID $2E command defined in ISO 14229, for example. If a cancelation condition is provided in such a manner, modification (resetting) of a threshold that has been already set is permitted, thus making it possible to ensure the robustness for the threshold, while ensuring flexibility that allows the threshold to be modified as needed.

Figure 3:
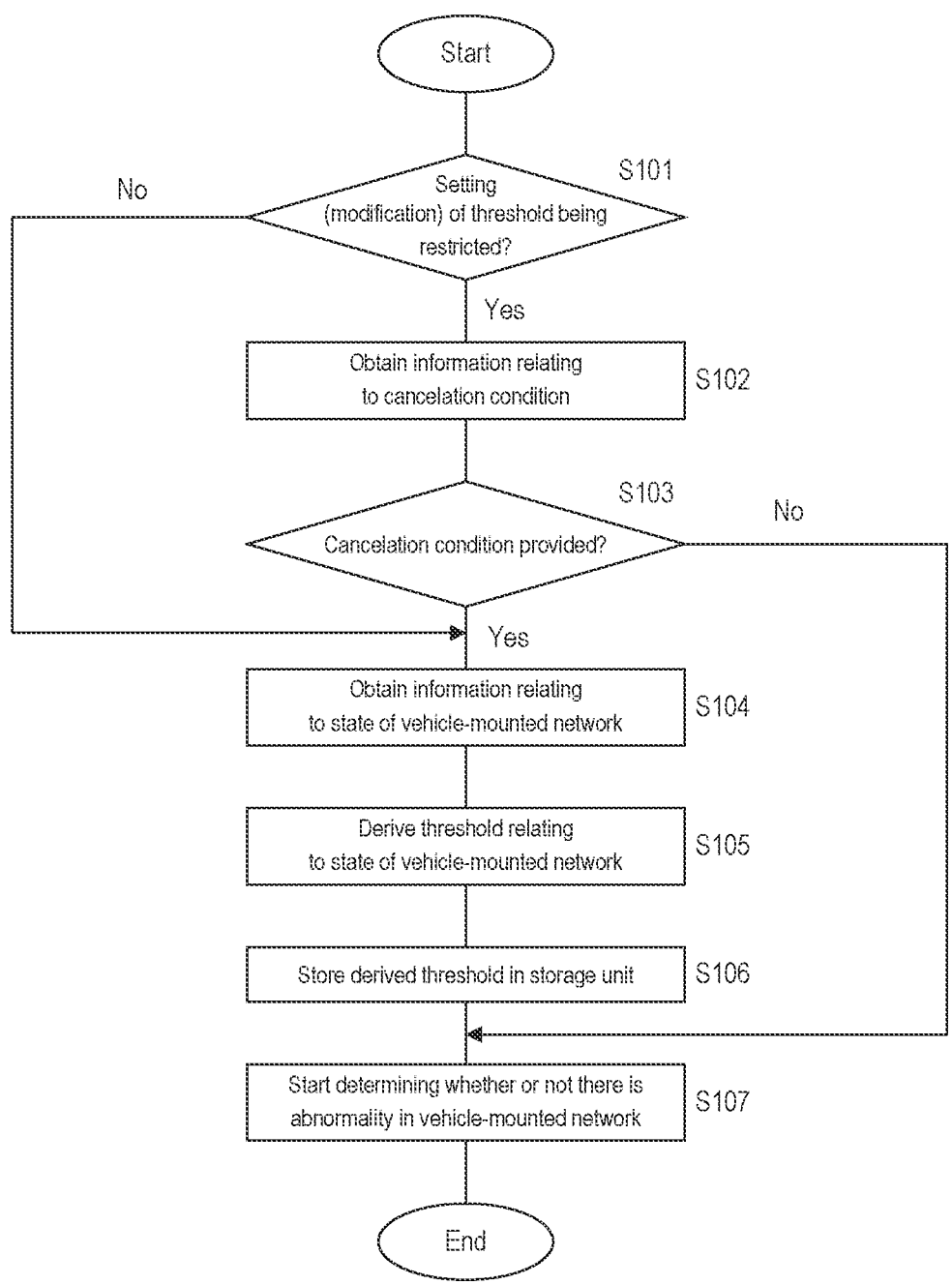
FIG. 3 is a flowchart illustrating exemplary processing performed by a control unit of the vehicle-mounted relay device.

FIG. 3 is a flowchart illustrating exemplary processing performed by the control unit 20 of the vehicle-mounted relay device 2. The control unit 20 of the vehicle-mounted relay device 2 steadily performs the following processing in the manufacturing stage of the vehicle C or after completion of manufacture thereof when the vehicle C is in the activated state (the IG switch 6 is turned on), for example.

The control unit 20 of the vehicle-mounted relay device 2 determines whether setting (modification) of the threshold is being restricted (S101). The control unit 20 determines whether or not setting (modification) of the threshold is being restricted, for example, based on whether the threshold has already been stored in the storage unit 21, or by referring to a setting flag indicating the set state of the threshold. If the threshold has already been stored in the storage unit 21, or if the setting flag indicates a set state, the control unit 20 determines that setting (modification) of the threshold is being restricted (S101: YES). If the threshold has not yet been stored in the storage unit 21, or if the setting flag indicates an unset state, the control unit 20 determines that setting (modification) of the threshold is not being restricted (S101: NO). For example, in a step subsequently performed after the vehicle-mounted relay device 2 (own device) has been mounted in the vehicle C, including, for example, the manufacturing stage of the vehicle C, the threshold has not yet been stored in the storage unit 21, and the control unit 20 determines that setting (modification) of the threshold is not being restricted.

If setting of the threshold is being restricted (S101: YES), the control unit 20 of the vehicle-mounted relay device 2 obtains information relating to the cancelation condition (S102). As described above, the control unit 20 obtains information relating to the cancelation condition, such as information relating to the state of connection to a factory tool or the like, or information or the like that is output from the vehicle-mounted device via the vehicle-mounted network 4. The control unit 20 may communicate, for example, with the external server 100 via the out-of-vehicle communication device 1, and obtain the information relating to the cancelation condition from the external server 100.

The control unit 20 of the vehicle-mounted relay device 2 determines whether or not the cancelation condition is provided (S103). The control unit 20 determines, based on the obtained information relating to the cancelation condition, whether or not the cancelation condition is provided. The control unit 20 may determine that the cancelation condition is provided, based on information indicating that the number of times that the IG switch 6 is turned on is less than or equal to a predetermined time, that the positional information on the GPS belongs to the location of the assembly plant of the vehicle C, or the like.

For example, if the vehicle C is in the manufacturing stage, and it is thus determined that setting of the threshold in not being restricted (S101: NO), or if it is determined that the cancelation condition is provided (S103: YES), the control unit 20 of the vehicle-mounted relay device 2 obtains the information relating to the state of the vehicle-mounted network 4 (S104). That is, if the threshold is initially set in the manufacturing stage or the like of the vehicle C, or if the cancelation condition is provided when resetting the threshold that has already been set, the control unit 20 obtains information relating to the state of the vehicle-mounted network 4. The control unit 20 obtains the information relating to the state of the vehicle-mounted network 4, including an average bus load or the like caused by the traffic on each of the communication lines 41 (buses) respectively connected to the in-vehicle communication units 23 (Ethernet communication unit 231, CAN communication unit 232) included in the vehicle-mounted relay device 2, or a standard deviation of transmission intervals of data that is transmitted cyclically.

The control unit 20 of the vehicle-mounted relay device 2 derives a threshold relating to the state of the vehicle-mounted network 4 (S105). For example, the control unit 20 derives, as the threshold, a value obtained by multiplying the obtained average bus load or standard deviation of transmission intervals by a predetermined coefficient or ratio so as to include a margin value.

The control unit 20 of the vehicle-mounted relay device 2 stores the derived threshold in the storage unit 21 (S106). The control unit 20 stores each of the derived thresholds in the storage unit 21, and sets the threshold as a threshold for performing abnormality determination in the vehicle-mounted network 4.

Based on the derived threshold, the control unit 20 of the vehicle-mounted relay device 2 starts determining whether there is an abnormality in the vehicle-mounted network 4 (S107). The control unit 20 starts determining whether there is an abnormality in the vehicle-mounted network 4, using the threshold that has been set for performing abnormality determination in the vehicle-mounted network 4. When the threshold relates to the average bus load, if a bus load exceeding the threshold of the average bus load has been detected on any of the communication lines 41 (buses), the control unit 20 determines that an abnormality has occurred in the communication line 41 (bus). When the threshold relates to the standard deviation of transmission intervals of data that is transmitted cyclically, if the standard deviation of transmission intervals of the cyclically transmitted data exceeds the threshold of the standard deviation, the control unit 20 determines that an abnormality has occurred in the communication line 41 (bus) to which the vehicle-mounted ECU 3 that transmits the data is connected. In this case, the control unit 20 may determine that an abnormality has occurred in the vehicle-mounted ECU 3 that transmits the data. The control unit 20 may determine that an abnormality has occurred, if the average bus load, or the standard deviation or the like of transmission intervals of the data has successively exceeded the corresponding threshold a plurality of number of times, or has exceeded the corresponding threshold a plurality of times in a predetermined period.

The control unit 20 may output information relating to a determination result, for example, to the display device 5, and causes the display device 5 to display the determination result. By causing the display device 5 to display the determination result, the determination result can be notified to the operator of the vehicle C.

According to the present embodiment, the vehicle-mounted relay device 2 can efficiently derive a threshold based on the specifications or characteristics corresponding to each individual vehicle C by deriving a threshold relating to the state of the vehicle-mounted network 4 in a step subsequently performed after the own device has been mounted in the vehicle C, including, for example, the manufacturing stage of the vehicle C. Since the derived threshold is based on the specifications or characteristics corresponding to each individual vehicle C, it is possible, with the threshold, to accurately determine whether or not there is an abnormality in each of the plurality of buses included in the vehicle-mounted network 4.

According to the present embodiment, restriction on modification to the derived threshold is allowed to ensure the robustness of the threshold, and if a predetermined cancelation condition is satisfied, the vehicle-mounted relay device 2 cancels the restriction on the modification of the threshold, and modifies (resets) the threshold. Accordingly, it is possible to ensure the robustness of the threshold while resetting the threshold as needed, and determine, based on the reset threshold, whether or not there is an abnormality in the vehicle-mounted network 4, thus making it possible to efficiently ensure the appropriateness of the threshold.

Embodiment 2

Figure 4:
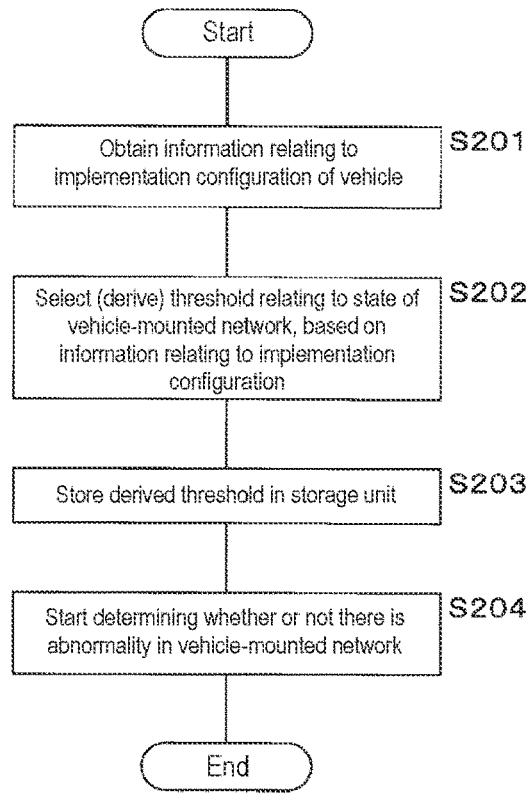
FIG. 4 is a flowchart illustrating exemplary processing performed by a control unit of a vehicle-mounted relay device according to Embodiment 2.

FIG. 4 is a flowchart illustrating exemplary processing performed by a control unit 20 of a vehicle-mounted relay device 2 according to Embodiment 2. The vehicle-mounted relay device 2 of Embodiment 2 differs from Embodiment 1 in that the vehicle-mounted relay device 2 selects, based on information relating to implementation configuration of the vehicle C, any threshold from among a plurality of candidate thresholds, and derives the threshold as a threshold relating to the state of the vehicle-mounted network 4.

A plurality of candidate thresholds are stored in a storage unit 21 of the vehicle-mounted relay device 2. Each of the candidate thresholds may be stored as a threshold set including an average bus load, a maximum bus load value, a bus load fluctuating range, and a standard deviation of transmission intervals of data that is transmitted cyclically, which are thresholds of different types. Each of the threshold sets may be stored on a unit-by-unit basis, or as a combination of a plurality of units, according to the unit of the implementation configuration of the vehicle C, such as a destination unit, a vehicle type unit, a unit of a vehicle type and an equipment package, a vehicle rank (platform) unit, or a manufacturer or dealer option unit. For example, threshold sets of the destination unit include a threshold set for Japan, a threshold set for North America, and a threshold set for Europe. For example, threshold sets of the vehicle type unit include a threshold set for vehicle type A, a threshold set for vehicle type B, and a threshold set for vehicle type C. For example, threshold sets of the option unit include a threshold set with standard equipment, a threshold set with MOP (manufacturer option), a threshold set with DOP (dealer option), and a threshold set with MOPDOP. Each of the threshold sets is stored in the storage unit 21 in association with the information relating to the corresponding unit of the implementation configuration.

As described above, the information relating to the implementation configuration of the vehicle C, such as vehicle configuration information or vehicle specifications, is stored in the storage unit 21 of the vehicle-mounted relay device 2. Accordingly, the control unit 20 (deriving unit) of the vehicle-mounted relay device 2 can select the threshold set corresponding to the information relating to the implementation configuration of the vehicle C, and derive the threshold suitable for the own vehicle (the vehicle C in which the own device is mounted).

Although the plurality of candidate thresholds (threshold sets) are described as being stored in the storage unit 21 of the vehicle-mounted relay device 2, the present disclosure is not limited thereto. The plurality of candidate thresholds (threshold sets) may be stored in an external server 100 that is communicably connected to the vehicle-mounted relay device 2, or a storage unit 101 of a factory tool or a diagnostic tool or the like. That is, the control unit 20 of the vehicle-mounted relay device 2 can obtain any threshold (threshold set) from among a plurality of candidate thresholds (threshold sets) stored in the storage unit 21 of the vehicle-mounted relay device 2, and a predetermined storage area that can be accessed from the control unit 20, such as the external server 100 or a factory tool or the like communicably connected to the vehicle-mounted relay device 2.

The control unit 20 of the vehicle-mounted relay device 2 steadily performs the following processing in the manufacturing stage of the vehicle C or after completion of manufacture thereof when the vehicle C is in the activated state (the IG switch 6 is turned on), for example. The control unit 20 of the vehicle-mounted relay device 2 obtains the information relating to the implementation configuration of the vehicle C (S201). The control unit 20 refers to, for example, the storage unit 21, and obtains the vehicle configuration information of the information relating to the implementation configuration of the vehicle C such as vehicle specifications or the like, each of which is stored in the storage unit 21. Alternatively, the control unit 20 may communicate with the external server 100 via the out-of-vehicle communication device 1, and obtain the information relating to the implementation configuration of the vehicle C from the external server 100. Alternatively, the control unit 20 may obtain the information relating to the implementation configuration of the vehicle C via an external connection terminal such as a factory tool or a diagnostic tool or the like communicably connected to the vehicle-mounted relay device 2.

The control unit 20 of the vehicle-mounted relay device 2 selects (derives), based on the information relating to the implementation configuration, the threshold relating to the state of the vehicle-mounted network 4 (S202). The control unit 20 selects, based on the obtained information relating to the implementation configuration of the vehicle C (own vehicle), the threshold set matching the own vehicle from among the plurality of candidate thresholds (threshold sets) stored in the storage unit 21, thus deriving the threshold. The control unit 20 sets the selected threshold set. In the case of setting a value from a factory tool or an authorized dealer, the control unit 20 may set the selected threshold set, for example, through parameter rewriting by diagnostic communication using a SID $2E command defined in ISO 14229. The control unit 20 may pass a specific communication message on the communication line 41 (bus) after security authentication has been performed for the vehicle-mounted relay device 2, and thus select the threshold (threshold set) in accordance with the message. The specific communication message may be a message in which a number (threshold set number) for specifying the threshold set is stored in a payload, using a specific CAN-ID, for example.

The control unit 20 of the vehicle-mounted relay device 2 stores the derived threshold in the storage unit 21 (S203). As in Embodiment 1, the control unit 20 sets the threshold derived by selecting the threshold from among the plurality of candidate thresholds (threshold sets), as a threshold for performing abnormality determination in the vehicle-mounted network 4. A storage area in which the threshold for performing the abnormality determination is stored may be defined in the storage unit 21, and the control unit 20 may store the selected threshold sets (each of the thresholds) in the storage area. Alternatively, for example, a flag indicating enabling or disabling may be added to each of the plurality of candidate thresholds (threshold sets) stored in the storage unit 21, and the flag of the selected threshold (threshold set) may be enabled, thus setting the selected threshold (threshold set) as the threshold for performing the abnormality determination.

Based on the derived threshold, the control unit 20 of the vehicle-mounted relay device 2 starts determining whether there is an abnormality in the vehicle-mounted network 4 (S204). As in processing step S107 in Embodiment 1, based on the derived threshold, the control unit 20 starts determining whether there is an abnormality in the vehicle-mounted network 4.

According to the present embodiment, the plurality of candidate thresholds (threshold sets) serving as the candidates for the threshold relating to the state of the vehicle-mounted network 4 are stored in the storage unit 21. Accordingly, the control unit 20 of the vehicle-mounted relay device 2 can select, based on the information relating to the implementation configuration of the vehicle C (own vehicle) in which the own device is mounted, the threshold (threshold set) suitable for the own vehicle, thus efficiently deriving the threshold (threshold set). For example, even if addition or modification has been made to options to be mounted in the vehicle C by an authorized dealer or the like, the control unit 20 of the vehicle-mounted relay device 2 can re-select a threshold (threshold set) suitable for the own vehicle, based on the information relating to the implementation configuration in which the addition or the like has been reflected, thus statically modifying the set threshold (threshold set).

Embodiment 3

Figure 5:
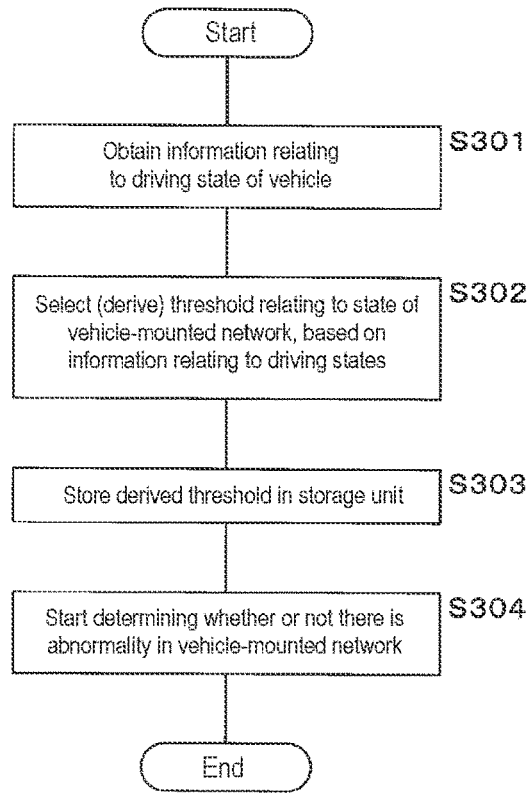
FIG. 5 is a flowchart illustrating exemplary processing performed by a control unit of a vehicle-mounted relay device according to Embodiment 3.

FIG. 5 is a flowchart showing exemplary processing performed by a control unit 20 of a vehicle-mounted relay device 2 according to Embodiment 3. The vehicle-mounted relay device 2 of Embodiment 3 differs from Embodiment 1 in that the vehicle-mounted relay device 2 selects, based on information relating to the driving state of the vehicle C, any threshold from among a plurality of candidate thresholds, and derive the threshold as a threshold relating to the state of the vehicle-mounted network 4. In addition, the vehicle-mounted relay device 2 of Embodiment 3 differs from Embodiment 2 in that the vehicle-mounted relay device 2 dynamically modifies the threshold, based on the information relating to the driving state of the vehicle C, unlike Embodiment 2, in which the threshold is statically modified assuming that addition of options or the like has been performed by an authorized dealer or the like.

A plurality of candidate thresholds are stored in a storage unit 21 of the vehicle-mounted relay device 2. Each of the candidate thresholds may be stored as a threshold set including an average bus load, a maximum bus load value, a bus load fluctuating range, and a standard deviation of transmission intervals of data that is transmitted cyclically, which are thresholds of different types. Each of the threshold sets may be stored on a unit-by-unit basis, or as a combination of a plurality of units, according to the unit of the driving state of the vehicle C, such as a driving-mode unit or a power saving-mode unit. For example, threshold sets of the driving mode unit include a normal-mode threshold set, a sport-mode threshold set, and an eco-mode threshold set. For example, threshold sets of the power saving-mode unit correspond to the residual capacity (SOC) of a power storage device such as a secondary battery, and include a threshold set for SOC of 50% or more and a threshold set for SOC of less than 50%. Each of the threshold sets is stored in the storage unit 21 in association with the information relating to the corresponding unit of the driving state. As in Embodiment 2, the plurality of candidate thresholds (threshold sets) are not limited to those stored in the storage unit 21 of the vehicle-mounted relay device 2, and may be stored in the storage unit 101 of the external server 100 or the like.

The information relating to the driving state of the vehicle C at the current point of time, such as information relating to the driving mode of the vehicle C (own vehicle), or information relating to the residual capacity of the power storage device, is included in the data transmitted from the vehicle-mounted ECUs 3 connected to the vehicle-mounted network 4. Accordingly, the control unit 20 (deriving unit) of the vehicle-mounted relay device 2 can obtain the information relating to the driving state of the vehicle C (own vehicle) such as the information relating to the driving mode when obtaining or relaying the data transmitted from these vehicle-mounted ECUs 3.

The control unit 20 of the vehicle-mounted relay device 2 steadily performs the following processing when the vehicle C is in the activated state (the IG switch 6 is turned on), for example. The control unit 20 of the vehicle-mounted relay device 2 obtains the information relating to the driving state of the vehicle C (S301). The control unit 20 obtains the information relating to the driving state of the vehicle C (own vehicle), such as the information relating to the driving mode, by obtaining or relaying the data transmitted from the vehicle-mounted ECUs 3.

The control unit 20 of the vehicle-mounted relay device 2 selects (derives), based on the information relating to the driving state, a threshold relating to the state of the vehicle-mounted network 4 (S302). For example, if the control unit 20 obtains the information relating to the driving mode, the control unit 20 determines, based on the information relating to the driving mode, the type of the driving mode of the vehicle C (own vehicle). For example, if the control unit 20 determines that the type of the driving mode is the normal mode, the control unit 20 derives the threshold (threshold set) by selecting the threshold (threshold set) corresponding to the normal mode. For example, if the control unit 20 obtains the information (SOC of 70%) relating to the residual capacity of the power storage device such as a secondary battery, the control unit 20 derives the threshold (threshold set) by selecting the threshold (threshold set: threshold set for SOC of 50% or more) of the power saving mode corresponding to the residual capacity.

The control unit 20 of the vehicle-mounted relay device 2 stores the derived threshold in the storage unit 21 (S303). As in Embodiment 1, the control unit 20 sets the threshold derived by selecting the threshold from among the plurality of candidate thresholds (threshold sets), as a threshold for performing abnormality determination in the vehicle-mounted network 4. As in processing step S203 in Embodiment 2, the control unit 20 may store the selected threshold sets (each of the thresholds) in the storage area in which the threshold for performing the abnormality determination is stored. Alternatively, the control unit 20 may enable the flag of the selected threshold (threshold set), thus setting the selected threshold (threshold set) as the threshold for performing the abnormality determination.

Based on the derived threshold, the control unit 20 of the vehicle-mounted relay device 2 starts determining whether there is an abnormality in the vehicle-mounted network 4 (S304). As in processing step S107 in Embodiment 1, based on the derived threshold, the control unit 20 starts determining whether there is an abnormality in the vehicle-mounted network 4.

According to the present embodiment, the plurality of candidate thresholds (threshold sets) serving as the candidates for the threshold relating to the state of the vehicle-mounted network 4 are stored in the storage unit 21. Accordingly, the control unit 20 of the vehicle-mounted relay device 2 can select, based on the information relating to the driving state of the vehicle C (own vehicle) in which the own device is mounted, the threshold (threshold set) suitable for the own vehicle, thus efficiently deriving the threshold (threshold set). For example, even if the driving mode of the vehicle C has been modified, or if the charging rate of the power storage device of the vehicle C has fluctuated, the control unit 20 of the vehicle-mounted relay device 2 can dynamically modify the set threshold (threshold set) by re-selecting the threshold (threshold set) suitable for the own vehicle, based on the information relating to the driving state of the vehicle C (own vehicle) at the current point in time.

It should be appreciated that the embodiments disclosed herein are to be construed in all respects as illustrative and not limiting. The scope of the present invention is defined by the claims, rather than by the description preceding them, and is intended to include all modifications which fall within the scope of the claims and the meaning and scope of equivalents thereof.

The invention claimed is:

1. A vehicle-mounted relay device that relays data flowing through a vehicle-mounted network mounted in a vehicle, comprising:
   a CAN communication unit connected to a first bus for performing CAN communication; and
   an Ethernet communication unit connected to a second bus for performing Ethernet communication,
   a control unit that controls processing relating to relaying of the data,
   the control unit derives a threshold relating to a state of each of the first bus and the second bus of the vehicle-mounted network, the state of the vehicle-mounted network being information transmitted using CAN communication directed to the driving state of the vehicle,
   determines, based on the derived threshold, an abnormality in the vehicle-mounted network; and
   wherein the threshold relating to the state of the vehicle-mounted network includes a threshold relating to a correlation value between states of communication respectively performed with the CAN communication unit and the Ethernet communication unit, and wherein modification of the derived threshold is restricted and the control unit cancels the restriction based on a cancellation condition.

2. The vehicle-mounted relay device according to claim 1, wherein the control unit obtains information relating to a state of the vehicle-mounted network, and
   derives, based on the obtained information relating to the state of the vehicle-mounted network, a threshold relating to the state of the vehicle-mounted network.

3. The vehicle-mounted relay device according to claim 2, wherein
   the control unit cancels the restriction on the modification of the threshold and newly derives a threshold when a cancelation condition for cancelling the restriction is satisfied, and determines, based on the newly derived threshold, an abnormality in the vehicle-mounted network.

4. The vehicle-mounted relay device according to claim 1, wherein a plurality of candidate thresholds serving as candidates for a threshold relating to a state of the vehicle-mounted network are stored in a predetermined storage area, and the control unit derives, based on information relating to implementation configuration of the vehicle, any threshold from among the plurality of candidate thresholds as the threshold relating to the state of the vehicle-mounted network by referring to the predetermined storage area.

5. The vehicle-mounted relay device according to claim 1, wherein a plurality of candidate thresholds serving as candidates for a threshold relating to a state of the vehicle-mounted network are stored in a predetermined storage area, and the control unit derives, based on information relating to a driving state of the vehicle, any threshold from among the plurality of candidate thresholds as the threshold relating to the state of the vehicle-mounted network by referring to the predetermined storage area.

6. The vehicle-mounted relay device according to claim 1, wherein the threshold relating to the state of the vehicle-mounted network includes a threshold relating to traffic of the vehicle-mounted network.

7. The vehicle-mounted relay device according to claim 1, wherein the threshold relating to the state of the vehicle-mounted network includes a threshold relating to a standard deviation of reception intervals of data that is transmitted cyclically in the vehicle-mounted network.

8. The vehicle-mounted relay device according to claim 1, further comprising:

a plurality of communication units respectively connected to a respective plurality of buses included in the vehicle-mounted network, wherein the control unit derives a threshold relating to a state of each of the plurality of buses respectively connected to the plurality of communication units, and determines, based on each of the derived thresholds, whether or not there is an abnormality in each of the plurality of buses included in the vehicle-mounted network.

* * * * *